United States Patent
Ravindra et al.

(10) Patent No.: US 9,868,458 B1
(45) Date of Patent: Jan. 16, 2018

(54) ADJUSTABLE STEERING COLUMN ASSEMBLY HAVING A LOCKING ASSEMBLY

(71) Applicant: Steering Solutions IP Holding Corporation, Saginaw, MI (US)

(72) Inventors: Ravi Ravindra, Saginaw, MI (US); Joen C. Bodtker, Gaines, MI (US); Michael P. Anspaugh, Bay City, MI (US); Donald A. Buzzard, Saginaw, MI (US); Justin D. Mills, Clio, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/225,312

(22) Filed: Aug. 1, 2016

(51) Int. Cl.
  *B62D 1/19* (2006.01)
  *B62D 1/184* (2006.01)

(52) U.S. Cl.
  CPC .............. *B62D 1/195* (2013.01); *B62D 1/184* (2013.01)

(58) Field of Classification Search
  CPC .................................. B62D 1/195; B62D 1/184
  See application file for complete search history.

(56) References Cited

U.S. PATENT DOCUMENTS

| | | | | |
|---|---|---|---|---|
| 7,878,543 B2* | 2/2011 | Bodtker | ................ | B62D 1/184 280/775 |
| 2005/0178231 A1* | 8/2005 | Schick | .................. | B62D 1/184 74/493 |
| 2006/0273567 A1* | 12/2006 | Fix | ......................... | B62D 1/184 280/775 |
| 2007/0234845 A1* | 10/2007 | Gist, Jr. | ................ | B62D 1/184 74/569 |
| 2012/0312117 A1* | 12/2012 | Maniwa | ................. | B62D 1/184 74/493 |
| 2016/0107676 A1* | 4/2016 | Kubota | .................. | B62D 1/184 74/495 |
| 2016/0144885 A1* | 5/2016 | Tanaka | .................. | B62D 1/187 74/493 |
| 2016/0176433 A1* | 6/2016 | Okano | ................... | B62D 1/184 74/495 |
| 2017/0050665 A1* | 2/2017 | Appleyard | ............. | B62D 1/192 |

* cited by examiner

*Primary Examiner* — Drew J Brown
(74) *Attorney, Agent, or Firm* — Cantor Colburn LLP

(57) ABSTRACT

An adjustable steering column assembly includes a locking assembly having a first member, a second member, and a third member. The first member has a first member first surface that defines a first recess and a second recess and has a first member second surface disposed opposite the first member first surface. The second member is disposed opposite the first member. The second member has a second member first surface that faces towards the first member first surface. The second member first surface defines a third recess and a fourth recess and has a second member second surface disposed opposite the second member first surface. The third member is disposed between the first member and the second member. The third member is movable relative to the first member and the second member between a lock position and an unlock position.

17 Claims, 4 Drawing Sheets

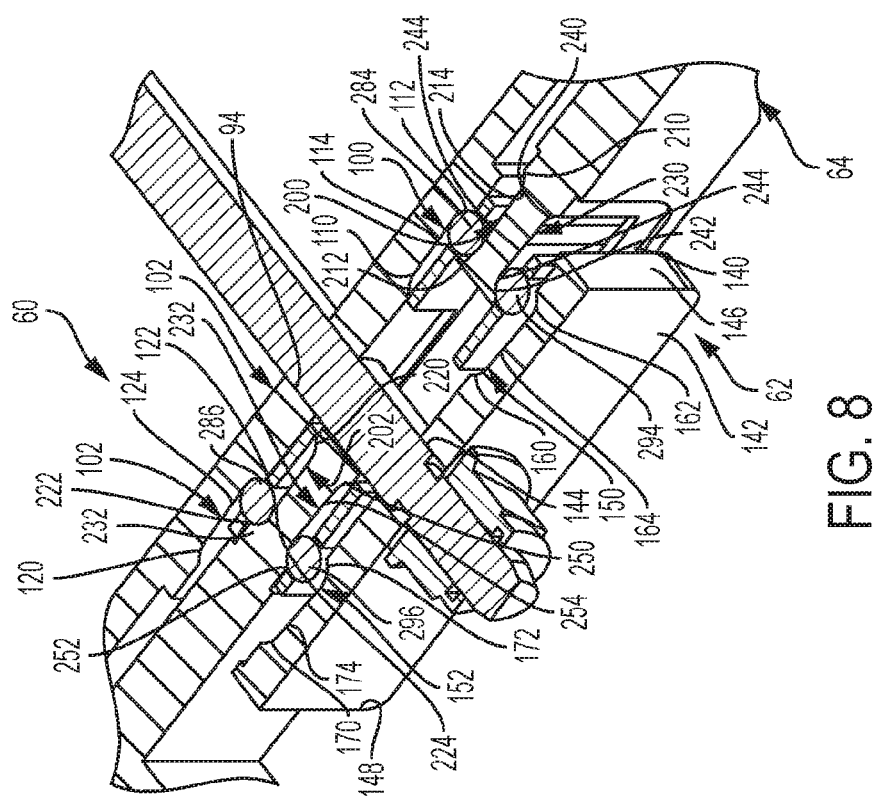
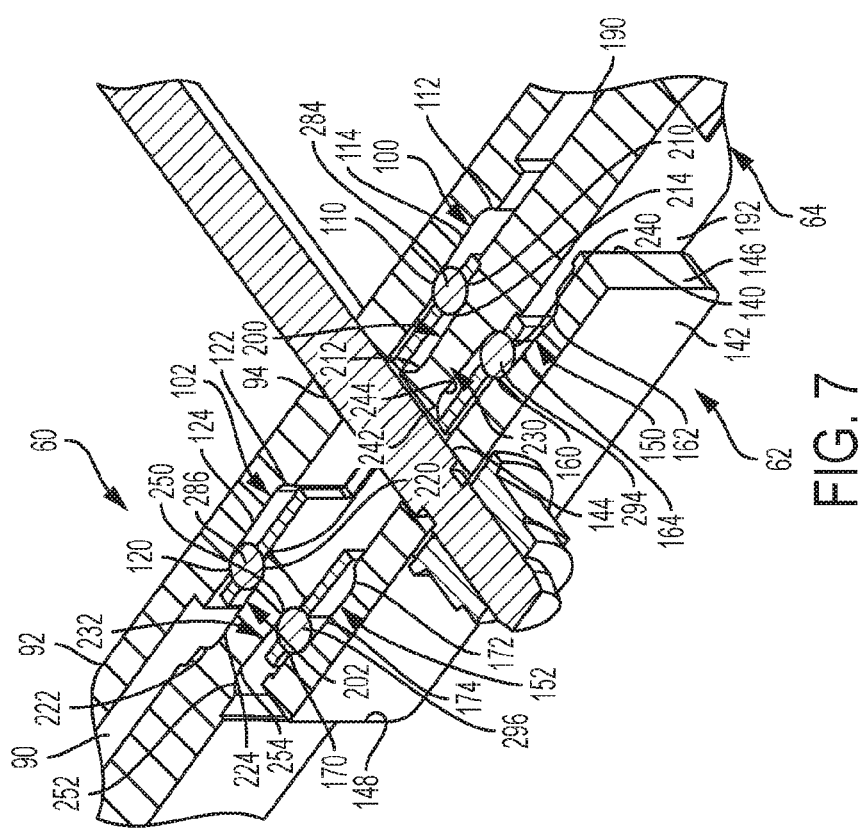

ADJUSTABLE STEERING COLUMN ASSEMBLY HAVING A LOCKING ASSEMBLY

BACKGROUND OF THE INVENTION

Steering column assemblies are commonly provided with an adjustment mechanism. The adjustment mechanism is configured to enable a steering column assembly to be adjusted telescopically or pitched relative to an operator of the vehicle. The steering column assembly is provided with a lever to lock the telescoping or the rake adjusted position of the steering column assembly. The lever is associated with a locking mechanism that generates a clamp tension to lock the telescoping or rake adjusted position of the steering column assembly. The locking mechanism may include a mini follower or toggling pins.

SUMMARY OF THE INVENTION

According to an embodiment of the present disclosure, an adjustable steering column assembly is provided. The adjustable steering column assembly includes jacket assembly, and a locking assembly. The jacket assembly is connected to a support bracket. The locking assembly is connected to the support bracket and includes a first member, a second member, and a third member. The first member has a first member first surface that defines a first recess and a second recess and has a first member second surface disposed opposite the first member first surface. The second member is disposed opposite the first member. The second member has a second member first surface that faces towards the first member first surface. The second member first surface defines a third recess and a fourth recess and has a second member second surface disposed opposite the second member first surface. The third member is disposed between the first member and the second member. The third member is movable relative to the first member and the second member between a lock position and an unlock position.

According to yet another embodiment of the present disclosure, an adjustable steering column assembly is provided. The adjustable steering column assembly a locking assembly. The locking assembly is connected to the support bracket and includes a first member, a second member, and a third member. The first member has a first member first surface and a first member second surface that is disposed opposite the first member first surface. The second member is spaced apart from the first member. The second member has a second member first surface that faces towards the first member first surface and a second member second surface that is disposed opposite the second member first surface. The third member is disposed between the first member and the second member. The third member has a third member first surface and a third member second surface disposed opposite the third member first surface. The third member first surface faces towards the first member first surface. The third member first surface has a first cam region and a second cam region. The third member second surface faces towards the second member first surface. The third member second surface has a third cam region and a fourth cam region.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 7 is a partial cross-sectional view of the locking assembly in the lock position;

FIG. 8 is a partial cross-sectional view of the locking assembly in the unlock position;

DETAILED DESCRIPTION

Referring now to the Figures, where the present disclosure will be described with reference to specific embodiments, without limiting same, it is to be understood that the disclosed embodiments are merely illustrative and may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
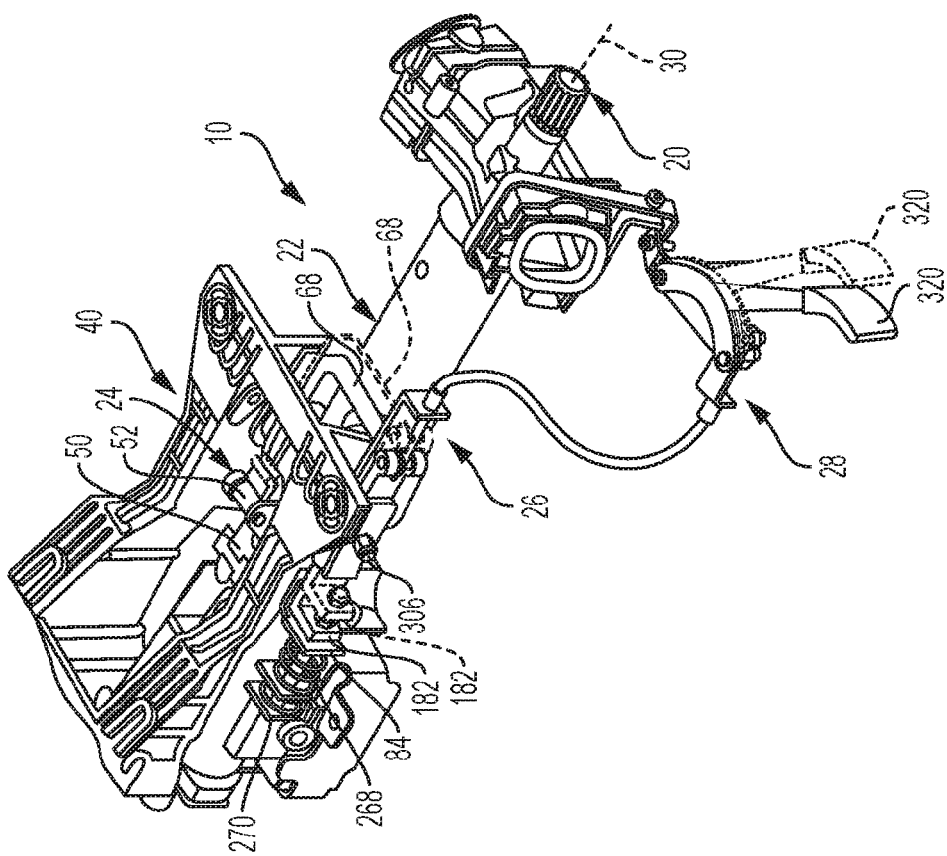
FIG. 1 is a perspective view of an adjustable steering column assembly having a locking assembly in a lock position.
Figure 2:
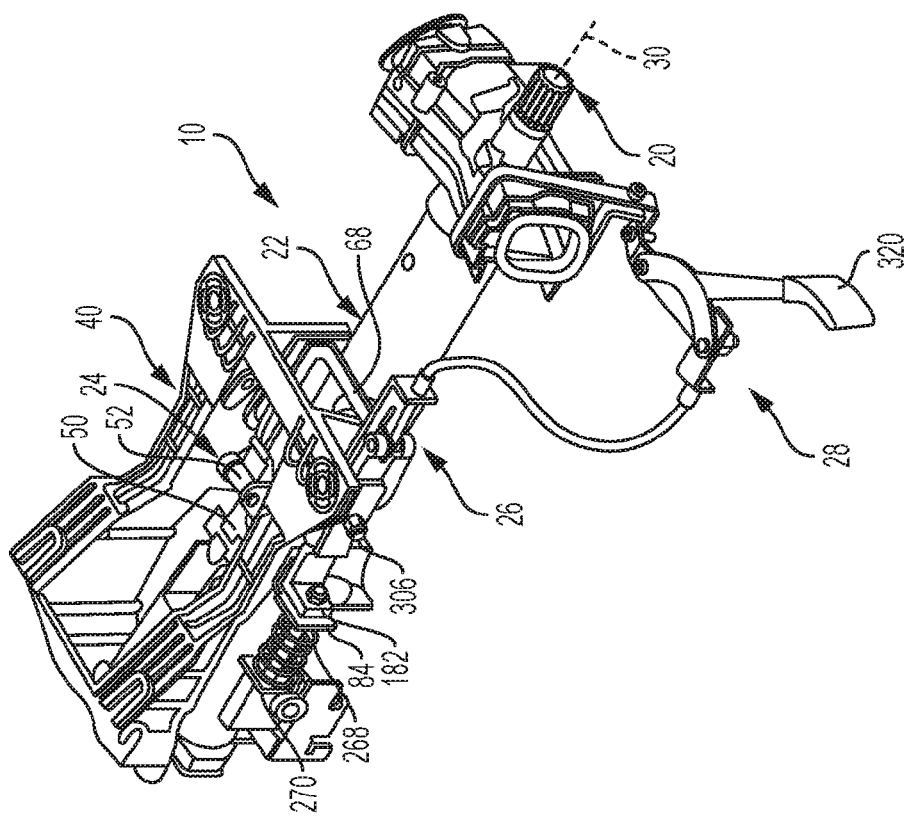
FIG. 2 is a perspective view of the adjustable steering column assembly having the locking assembly in an unlock position.
Figure 3:
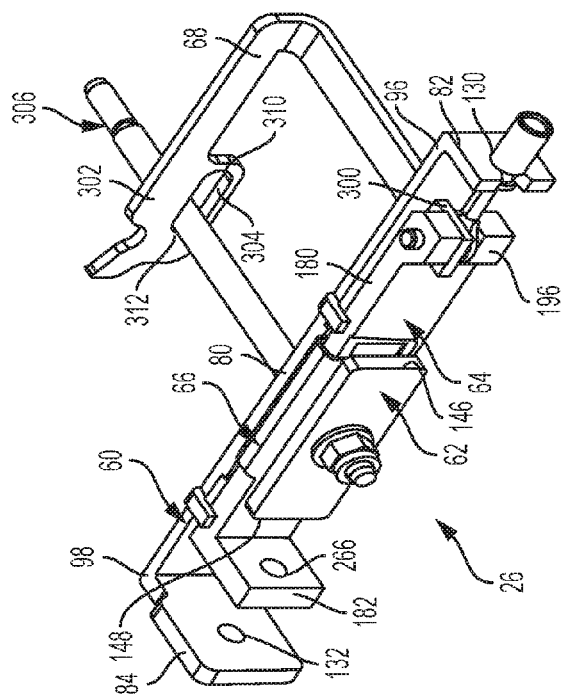
FIG. 3 is a perspective view of the locking assembly in the lock position.
Figure 5:
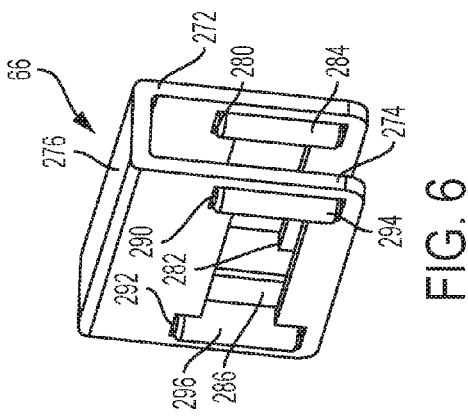
FIG. 5 is a perspective view of a third member of the locking assembly.
Figure 4:
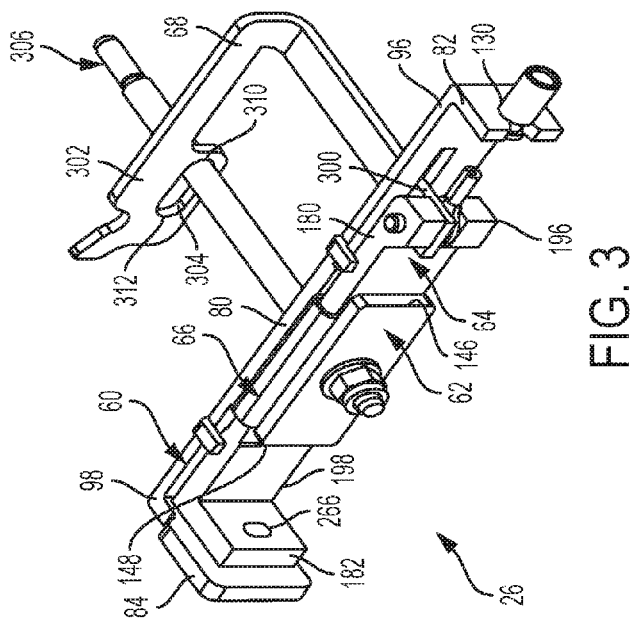
FIG. 4 is a perspective view of the locking assembly in the unlock position.
Figure 6:
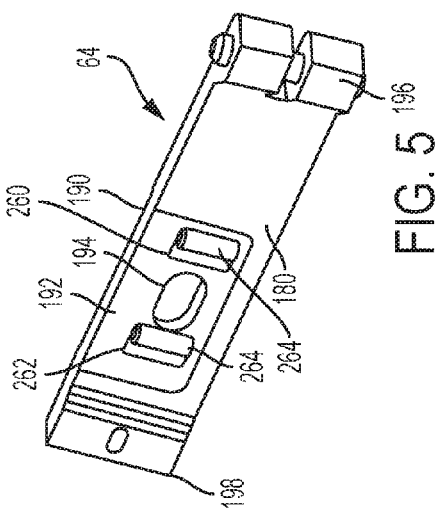
FIG. 6 is a perspective view of a carrier of the locking assembly.

Referring to FIGS. 1 and 2, an adjustable steering column assembly 10 is shown in a lock position and an unlock position, respectively. The components of the adjustable steering column assembly 10 that move relative to other components are illustrated with dashed feature lines. The adjustable steering column assembly 10 may be a pivot or pivot and axially adjustable steering column assembly. The adjustable steering column assembly 10 includes a steering shaft 20, a jacket assembly 22, an energy absorption assembly 24, a locking assembly 26, and an actuator assembly 28.

The steering shaft 20 extends along a steering axis 30. The steering shaft 20 extends at least partially through the jacket assembly 22 along the steering axis 30. A steering wheel is configured to attach to an end of the steering shaft 20. A rotational or other input applied to the steering wheel rotates or pivots the steering shaft 20 about the steering axis 30 to pivot or rotate at least one vehicle wheel via a steering system.

The jacket assembly 22 is configured to carry or rotatably support the steering shaft 20. The jacket assembly 22 is attached to a vehicle structure, such as an instrument panel, by a support bracket 40. The jacket assembly 22 is extendable or retractable along the steering axis 30 to adjust a position of the steering wheel coupled to the jacket assembly 22 relative to an operator of the vehicle. The jacket assembly 22 is tiltable or pivotable about a pivot axis that is disposed transverse to the steering axis 30 to adjust a position of the steering wheel coupled to the jacket assembly 22 relative to the operator of the vehicle.

The energy absorption assembly 24 is disposed on the jacket assembly 22. The energy absorption assembly 24 is configured to provide a drag load or force opposing stroking or translation of the jacket assembly 22 along the steering axis 30 to decelerate the adjustable steering column assembly 10 during a steering column collapse event. The energy absorption assembly 24 includes an energy absorption strap 50 and a release member 52.

The energy absorption strap 50 includes a plurality of teeth that face towards the release member 52. The release member 52 is movable between an engaged position and a released position by the locking assembly 26. The release member 52 includes a plurality of locking teeth. The plurality of locking teeth of the release member 52 meshingly engage with the plurality of teeth of the energy absorption strap 50 when the release member 52 is in the engaged position. The plurality of locking teeth of the release member 52 do not meshingly engage with the plurality of teeth of the energy absorption strap 50 when the release member 52 is rotated to the released position by the locking assembly 26. The release member 52 is rotated from the engaged position towards the released position by the locking assembly 26 to permit extension/retraction of the jacket assembly 22 of the adjustable steering column assembly 10. The released position of the locking assembly 26 also permits tilting/pivoting of the jacket assembly 22 of the adjustable steering column assembly 10.

The locking assembly 26 is connected to the jacket assembly 22 and the support bracket 40. The locking assembly 26 is configured to apply a clamping load to the support bracket 40 and the jacket assembly 22 to inhibit extension/retraction or tilting/pivoting of the jacket assembly 22 of the adjustable steering column assembly 10 while the locking assembly 26 is in a lock position. The locking assembly 26 is configured to release the clamping load applied to the support bracket 40 and the jacket assembly 22 to permit extension/retraction or tilting/pivoting of the jacket assembly 22 of the adjustable steering column assembly 10 while the locking assembly 26 is in an unlock position. The locking assembly 26 is configured as a linear locking mechanism.

Referring to FIGS. 3-8, the locking assembly 26 includes a first member 60, a second member 62, a third member 64, a carrier 66, and an extension member 68. The first member 60 is disposed proximate a side of the support bracket 40. The first member 60 includes a first member body 80, a first member first arm 82, and a first member second arm 84.

The first member body 80 has a first member first surface 90, a first member second surface 92 disposed opposite the first member first surface 90, and a first member opening 94. The first member first surface 90 and the first member second surface 92 extend between a first member first end 96 and a first member second end 98.

The first member first surface 90 faces away from the support bracket 40. The first member first surface 90 defines a first recess 100 and a second recess 102. The first recess 100 is spaced apart from the second recess 102. The first recess 100 is disposed between the first member opening 94 and the first member first end 96. The first recess 100 has a first recess first end 110 and a first recess second end 112. The first recess 100 has a cam profile that extends from the first recess first end 110 towards the first recess second end 112. The cam profile is configured as a first ramped surface 114 extending from the first member first surface 90 towards the first member second surface 92.

The second recess 102 is disposed between the first member opening 94 and the first member second end 98. The second recess 102 has a second recess first end 120 and a second recess second end 122. The second recess 102 has a cam profile that extends from the second recess first end 120 towards the second recess second end 122. The cam profile is configured as a second ramped surface 124 extending from the first member first surface 90 towards the first member second surface 92. The second ramped surface 124 is substantially similar to the first ramped surface 114. In at least one embodiment, the second ramped surface 124 and the first ramped surface 114 are declined from the first member second end 98 towards the first member first end 96 to cause a de-energized clamp state of the unlocked position.

The first member second surface 92 faces towards the support bracket 40. The first member second surface 92 is substantially planar.

The first member first arm 82 extends from the first member first end 96. The first member first arm 82 is disposed substantially perpendicular to the first member body 80. The first member first arm 82 extends away from the support bracket 40. The first member first arm 82 defines a first arm opening 130.

First member second arm 84 extends from the first member second end 98. The first member second arm 84 is disposed substantially perpendicular to the first member body 80. The first member second arm 84 extends away from the support bracket 40. The first member second arm 84 defines a second arm opening 132.

The second member 62 is spaced apart from the first member 60. The second member 62 is disposed opposite the first member 60. The second member 62 has a second member first surface 140, a second member second surface 142 disposed opposite the second member first surface 140, and a second member opening 144.

The second member first surface 140 and the second member second surface 142 extend between a second member first end 146 and a second member second end 148.

The second member first surface 140 faces towards from the support bracket 40 and faces towards the first member first surface 90. The second member first surface 140 defines a third recess 150 and a fourth recess 152. The third recess 150 is spaced apart from the fourth recess 152. The third recess 150 is proximately aligned with the first recess 100.

The third recess 150 is disposed between the second member opening 144 and the second member first end 146. The third recess 150 has a third recess first end 160 and a third recess second end 162. The third recess 150 has a cam profile that extends from the third recess first end 160 towards the third recess second end 162. The cam profile is configured as a third ramped surface 164 extending from the second member first surface 140 towards the second member second surface 142.

The fourth recess 152 is disposed between the second member opening 144 and the second member second end 148. The fourth recess 152 is proximately aligned with the second recess 102. The fourth recess 152 has a fourth recess first end 170 and a fourth recess second end 172. The fourth recess 152 has a cam profile that extends from the fourth recess first end 170 towards the fourth recess second end 172. The cam profile is configured as a fourth ramped surface 174 extending from the second member first surface 140 towards the second member second surface 142. The fourth ramped surface 174 is substantially similar to the third ramped surface 164. In at least one embodiment, the fourth ramped surface 174 and the third ramped surface 164 declined from the second member second end 148 towards the second member first end 146 to cause a de-energized clamp state of the unlocked position.

The third member 64 is disposed between the first member 60 and the second member 62. The third member 64 is movable relative to the first member 60 and the second member 62. The third member 64 is movable between a lock position and an unlock position.

The third member 64 has a third member body 180 and a third member extension 182. The third member body has a third member first surface 190, a third member second surface 192 disposed opposite the third member first surface 190, and a third member opening 194. The third member first surface 190 and the third member second surface 192 extend between a third member first end 196 and a third member second end 198.

The third member first surface 190 faces towards the support bracket 40. The third member first surface 190 faces towards the first member first surface 90. The third member first surface 190 defines a first cam region 200 and a second cam region 202. The first cam region 200 is spaced apart from the second cam region 202. The first cam region 200 is disposed between the third member opening 194 and the third member first end 196. The first cam region 200 has a first cam region first end 210 and a first cam region second end 212. The first cam region 200 has a cam profile that extends from the first cam region first end 210 towards the first cam region second end 212. The cam profile is configured as a first cam surface 214. The first cam region 200 becomes progressively closer to the first member first surface 90 in a direction that extends from the third member second end 198 towards the third member first end 196.

The second cam region 202 is disposed between the third member opening 194 and the third member second end 198. The second cam region 202 has a second cam region first end 220 and a second cam region second end 222. The second cam region 202 has a cam profile that extends from the second cam region first end 220 towards the second cam region second end 222. The cam profile is configured as a second cam surface 224. The second cam region 202 becomes progressively closer to the first member first surface 90 in a direction that extends from the third member second end 198 towards the third member first end 196.

The third member second surface 192 faces towards the second member first surface 140. The third member second surface 192 defines a third cam region 230 and a fourth cam region 232. The third cam region 230 is spaced apart from the fourth cam region 232. The third cam region 230 is disposed between the third member opening 194 and the third member first end 196. The third cam region 230 has a third cam region first end 240 and a third cam region second end 242. The third cam region 230 has a cam profile that extends from the third cam region first end 240 towards the third cam region second end 242. The cam profile is configured as a third cam surface 244. The third cam region 230 becomes progressively closer to the second member first surface 140 in a direction that extends from the third member second end 198 towards the third member first end 196.

The fourth cam region 232 is disposed between the third member opening 194 and the third member second end 198. The fourth cam region 232 has a fourth cam region first end 250 and a fourth cam region second end 252. The fourth cam region 232 has a cam profile that extends from the fourth cam region first end 250 towards the fourth cam region second end 252. The cam profile is configured as a fourth cam surface 254. The fourth cam region 232 becomes progressively closer to the second member first surface 140 in a direction that extends from the third member second end 198 towards the third member first end 196.

In at least one embodiment, the third member 64 defines a third member first opening 260 and a third member second opening 262. The third member first opening 260 extends from third member first surface 190 to the third member second surface 192. The third member first opening 260 is spaced apart from the third member opening 194 and the third member second opening 262. The third member first opening 260 is configured to receive a rolling element 264.

The third member second opening 262 extends from the third member first surface 190 to the third member second surface 192. The third member second opening 262 enlarges the third member opening 194. The third member second opening 262 is configured to receive a rolling element 264.

The third member extension 182 extends from the third member body 180. The third member extension 182 is disposed substantially perpendicular to the third member body 180. The third member body 180 is disposed substantially parallel to the first member second arm 84. The third member extension 182 defines an extension opening 266. The extension opening 266 is disposed substantially co-linear or co-axial with the second arm opening 132.

In at least one embodiment, a biasing member 268 is provided. The biasing member 268 is disposed between the first member second arm 84 and an engagement member 270 disposed on the support bracket 40. The biasing member 268 engages the first member second arm 84 and the engagement member 270. The biasing member 268 is coupled to the first member second arm 84 and the engagement member 270 by a fastener that extends through the extension opening 266 of the third member extension and the second arm opening 132 of the first member second arm 84 and an opening defined by the engagement member 270. In at least one embodiment, the biasing member 268 is connected to the third member second end 198 and the engagement member 270.

The engagement member 270 moves with the third member 64, relative to the first member 60, as the third member 64 moves between the lock position and the unlock position. As the third member 64 moves from the lock position towards the unlock position, the engagement member 270 compresses the biasing member 268 against the first member second arm 84 of the first member 60 or the third member second end 198 such that the biasing member 268 applies a biasing force to at least one of the third member extension 182 of the third member 64 and the engagement member 270 to bias the third member 64 towards the lock position.

The carrier 66 is disposed between the first member 60 and the second member 62. The carrier 66 is at least partially disposed about the third member 64 such that the carrier 66 straddles the third member 64. The carrier 66 is slidably engaged with the third member 64.

The carrier 66 includes a first sidewall 272, a second sidewall 274, and a bridge 276. The first sidewall 272 is disposed between the first member first surface 90 and the third member first surface 190. The first sidewall 272 defines a first opening 280 and a second opening 282. The first opening 280 is configured to receive a first rolling element 284. The second opening 282 is configured to receive a second rolling element 286. The second sidewall 274 is disposed between the second member first surface 140 and the third member second surface 192. The second sidewall 274 defines a third opening 290 and a fourth opening 292. The third opening 290 is configured to receive a third rolling element 294. The fourth opening 292 is configured to receive a fourth rolling element 296.

The first rolling element 284 is disposed proximate the first recess first end 110, while the third member 64 of the locking assembly 26 is in the lock position. The first rolling element 284 is disposed proximate the first cam region first end 210, while the third member 64 of the locking assembly 26 is in the lock position. The second rolling element 286 is disposed proximate the second recess first end 120, while the third member 64 of the locking assembly 26 is in the lock position. The second rolling element 286 is disposed proximate the second cam region first end 220, while the third member 64 of the locking assembly 26 is in the lock position. The third rolling element 294 is disposed proximate the third recess first end 160, while the third member 64 of the locking assembly 26 is in the lock position. The third rolling element 294 is disposed proximate the third cam region first end 240, while the third member 64 of the locking assembly 26 is in the lock position. The fourth rolling element 296 is disposed proximate the fourth recess first end 170, while the third member 64 of the locking assembly 26 is in the lock position. The fourth rolling element 296 is disposed proximate the fourth cam region first end 250, while the third member 64 of the locking assembly 26 is in the lock position.

The first rolling element 284 is disposed proximate the first recess second end 112, while the third member 64 of the locking assembly 26 is in the unlock position. The first rolling element 284 is disposed proximate the first cam region second end 212, while the third member 64 of the locking assembly 26 is in the unlock position. The second rolling element 286 is disposed proximate the second recess second end 122, while the third member 64 of the locking assembly 26 is in the unlock position. The second rolling element 286 is disposed proximate the second cam region second end 222, while the third member 64 of the locking assembly 26 is in the unlock position. The third rolling element 294 is disposed proximate the third recess second end 162, while the third member 64 of the locking assembly 26 is in the unlock position. The third rolling element 294 is disposed proximate the third cam region second end 242, while the third member 64 of the locking assembly 26 is in the unlock position. The fourth rolling element 296 is disposed proximate the fourth recess second end 172, while the third member 64 of the locking assembly 26 is in the unlock position to the fourth rolling element 296 is disposed proximate the fourth cam region second end 252, while the third member 64 of the locking assembly 26 is in the unlock position.

The bridge 276 extends between the first sidewall 272 and the second sidewall 274. The bridge 276 extends over the third member 64.

The extension member 68 extends between the third member 64 of the locking assembly 26 and the release member 52 of the energy absorption assembly 24. The extension member 68 is configured to rotate the release member 52 between the engaged position and the released position. The extension member 68 includes a first extension member end 300 and a second extension member end 302.

The first extension member end 300 is connected to the third member 64. The first extension member end 300 is connected to the third member first end 196. The first extension member end 300 is connected to the third member first end 196 by a pin that extends through the third member first end 196.

The second extension member end 302 is connected to the release member 52. The second extension member end 302 defines an extension member opening 304. The extension member opening 304 extends about or receives a portion of a clamp bolt 306 that extends through the jacket assembly 22, the locking assembly 26, and the support bracket 40. The clamp bolt 306 extends through the first member opening 94, the second member opening 144, and the third member opening 194.

The clamp bolt 306 is disposed proximate a first end 310 of the extension member opening 304 when the locking assembly 26 is in the lock position. The clamp bolt 306 is disposed proximate a second end 312 of the extension member opening 304 when the locking assembly 26 is in the unlock position. The clamp bolt 306 moves between the first end 310 of the extension member opening 304 and the second end 312 of the extension member opening 304 as the locking assembly 26 moves between the lock position and the unlock position.

The actuator assembly 28 is disposed on the jacket assembly 22 and is operatively connected to the third member 64 of the locking assembly 26. The actuator assembly 28 is configured to move the third member 64 between the lock position and the unlock position. The actuator assembly 28 moves the third member 64 of the locking assembly 26 from the lock position towards the unlock position, in response to the actuator assembly 28 being moved from a first position towards a second position while the third member 64 of the locking assembly 26 is in the lock position. The extension member 68 moves the release member 52 of the energy absorption assembly 24 from the engaged position towards the released position, in response to the actuator assembly 28 being moved from the first position towards the second position while the third member 64 of the locking assembly 26 is in the lock position.

Figure 9:
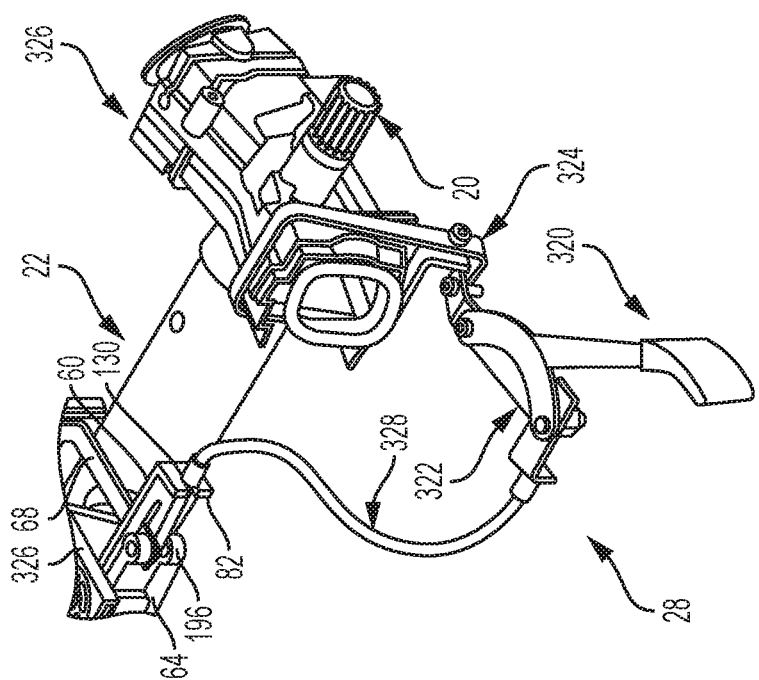
FIG. 9 is a partial perspective view of a first embodiment of an actuator assembly of the locking assembly.

Referring to FIG. 9, the actuator assembly 28 includes a lever 320, a mounting plate 322, a mounting bracket 324, a mounting base 326 affixed to the jacket assembly 22, and a cable 328. The lever 320 is pivotally connected to the jacket assembly 22 through the mounting plate 322 and the mounting bracket 324. In at least one embodiment, the lever 320 is pivotally connected to the jacket assembly 22. The lever 320 is pivotally connected to the mounting plate 322. The lever 320 of the actuator assembly 28 is movable between the first position and the second position. The first position corresponds to the lock position of the third member 64 of the locking assembly 26. The second position corresponds to the unlock position of the third member 64 of the locking assembly 26.

The cable 328 extends between the lever 320 and the third member first end 196. The cable 328 may be configured as a push pull cable or the like. An end of the cable 328 extends through the first arm opening 130 to the third member first end 196. The action of pivoting the lever 320 from the first position towards the second position tensions the cable 328 to move the third member 64 of the locking assembly 26 from the lock position towards the unlock position. The releasing of the lever 320 while in the second position, permits the lever 320 to move from the second position towards the first position. The releasing of the lever 320 enables the third member 64 of the locking assembly 26 to move from the unlock position towards the lock position due at least in part to the biasing member 268.

Figure 10:
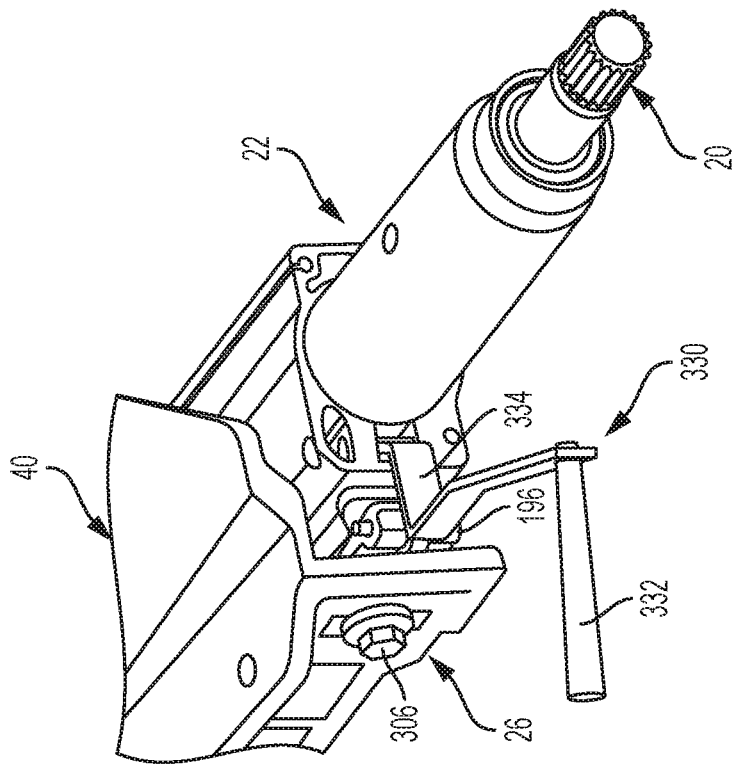
FIG. 10 is a partial perspective view of a second embodiment of an actuator assembly of the locking assembly.

Referring to FIG. 10, an actuator assembly 330 is shown. The actuator assembly 330 is slidably received within a portion of the jacket assembly 22. The actuator assembly 330 is connected to the third member 64 of the locking assembly 26. In this embodiment, the locking assembly 26 is positioned internal to the jacket assembly 22. As an alternate embodiment the locking assembly 26 could also be positioned external to the jacket assembly 22 and the support bracket 40 as shown in FIG. 1. The actuator assembly 330 is configured as a straight pull mechanism that moves the third member 64 of the locking assembly 26 between the lock position and the unlock position. The actuator assembly 330 eliminates the need for a cable 328 and may or may not include a biasing member 268. As an alternative embodiment, the actuator assembly 330 could also be remotely operated using the actuator assembly 28.

The actuator assembly 330 includes a handle 332 and an arm 334. The arm 334 extends from the handle 332 and extends into a portion of the jacket assembly 22. The arm 334 is connected to the third member first end 196.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the present disclosure, it is claimed:

1. An adjustable steering column assembly, comprising:
a jacket assembly connected to a support bracket; and
a locking assembly connected to the support bracket, the locking assembly comprising:
   a first member having a first member first surface that defines a first recess and a second recess and having a first member second surface disposed opposite the first member first surface,
   a second member disposed opposite the first member, the second member having a second member first surface that faces towards the first member first surface, the second member first surface defines a third recess and a fourth recess and having a second member second surface disposed opposite the second member first surface,
   a third member disposed between the first member and the second member, the third member has a third member first surface that faces towards the first member first surface and a third member second surface disposed opposite the third member first surface that faces towards the second member first surface, the third member being movable relative to the first member and the second member between a lock position and an unlock position; and a carrier having:
      a first sidewall disposed between the first member first surface and the third member first surface,
      a second sidewall disposed between the second member first surface and the third member second surface, and
      a bridge extending between the first sidewall and the second sidewall.

2. The adjustable steering column assembly of claim 1, wherein the first recess is aligned with the third recess and the second recess is aligned with the fourth recess.

3. The adjustable steering column assembly of claim 1, wherein the first sidewall includes a first opening that receives a first rolling element and a second opening that receives a second rolling element.

4. The adjustable steering column assembly of claim 3, wherein the second sidewall includes a third opening that receives a third rolling element and a fourth opening that receives a fourth rolling element.

5. The adjustable steering column assembly of claim 4, wherein while the third member is in the lock position, the first rolling element is disposed proximate a first recess first end, the second rolling element is disposed proximate a second recess first end, the third rolling element is disposed proximate a third recess first end, and the fourth rolling element is disposed proximate a fourth recess first end.

6. The adjustable steering column assembly of claim 5, wherein the locking assembly further comprising an actuator assembly operatively connected to a first end of the third member, the actuator assembly configured to move the third member between the lock position and the unlock position.

7. The adjustable steering column assembly of claim 6, wherein the actuator assembly includes:
   a lever pivotally connected to the jacket assembly, and
   a cable extending between the lever and the first end of the third member.

8. The adjustable steering column assembly of claim 7, wherein in response to the lever being pivoted from a first position towards a second position while the third member is in the lock position, the third member moves from the lock position towards the unlock position.

9. The adjustable steering column assembly of claim 8, wherein while the third member is in the unlock position, the first rolling element is disposed proximate a first recess second end, the second rolling element is disposed proximate a second recess second end, the third rolling element is disposed proximate a third recess second end, and the fourth rolling element is disposed proximate a fourth recess second end.

10. An adjustable steering column assembly, comprising:
a locking assembly connected to a support bracket and a jacket assembly, the locking assembly comprising:
   a first member having a first member first surface and a first member second surface disposed opposite the first member first surface,
   a second member spaced apart from the first member, the second member having a second member first surface that faces towards the first member first surface and a second member second surface disposed opposite the second member first surface,
   a third member disposed between the first member and the second member, the third member having a third member first surface having a first cam region and a second cam region that faces towards the first member first surface and a third member second surface having a third cam region and a fourth cam region disposed opposite the third member first surface that faces towards the second member first surface, and
   a carrier disposed between the first member and the second member and slidably engaged with the third member.

11. The adjustable steering column assembly of claim 10, wherein the carrier having a first sidewall provided with a first rolling element and a second rolling element, a second sidewall provided with a third rolling element and a fourth rolling element, and a bridge extending between the first sidewall and the second sidewall.

12. The adjustable steering column assembly of claim 11, wherein the locking assembly further comprising an actuator assembly disposed on the jacket assembly and operatively connected to the third member, the actuator assembly configured to move the third member between a lock position and an unlock position.

13. The adjustable steering column assembly of claim 12, wherein while the third member is in the lock position, the first rolling element is disposed proximate a first cam region first end, the second rolling element is disposed proximate a second cam region first end, the third rolling element is disposed proximate a third cam region first end, and the fourth rolling element is disposed proximate a fourth cam region first end.

14. The adjustable steering column assembly of claim 13, wherein the lock assembly further comprising an extension member having a first extension member end connected to the third member and a second extension member end connected to a release member of an energy absorption assembly disposed on the jacket assembly.

15. The adjustable steering column assembly of claim 14, wherein the release member of the energy absorption assembly is movable between an engaged position in which the release member engages an energy absorption strap of the energy absorption strap assembly and a released position in which the release member is disengaged from the energy absorption strap of the energy absorption strap assembly.

16. The adjustable steering column assembly of claim 15, wherein in response to the actuator assembly being moved from a first position towards a second position while the third member is in the lock position, the actuator assembly moves the third member from the lock position towards the unlock position and the extension member moves the release member from the engaged position to the released position.

17. The adjustable steering column assembly of claim 16, wherein while the third member is in the unlock position, the first rolling element is disposed proximate a first cam region second end, the second rolling element is disposed proximate a second cam region second end, the third rolling element is disposed proximate a third cam region second end, and the fourth rolling element is disposed proximate a fourth cam region second end.

* * * * *